United States Patent [19]
Lynam et al.

[11] Patent Number: 5,428,906
[45] Date of Patent: Jul. 4, 1995

[54] SLUDGE TREATMENT SYSTEM

[75] Inventors: Bart T. Lynam, Edmonds, Wash.; Gerald F. Nelson; David H. Meese, both of Portland, Oreg.; Ronald V. Peterson; Michael G. Ruby, both of Seattle, Wash.; Alan White, Portland, Oreg.

[73] Assignees: PCL Environmental, Inc., Bellevue; Sludge Management, Inc., Seattle, both of Wash.

[21] Appl. No.: 177,439

[22] Filed: Jan. 5, 1994

Related U.S. Application Data

[62] Division of Ser. No. 601,906, Oct. 23, 1990, Pat. No. 5,279,637.

[51] Int. Cl.6 .............................................. F26B 7/00
[52] U.S. Cl. .................... 34/379; 110/224; 210/770; 34/102; 34/484; 34/560
[58] Field of Search ............... 34/12, 60, 61, 376–379, 34/380, 381, 386, 485, 500, 560; 110/222, 228, 227, 224, 219, 220, 221; 210/768–770, 609, 771

[56] References Cited

U.S. PATENT DOCUMENTS

| | | | |
|---|---|---|---|
| Re. 31,185 | 3/1983 | Greenfield et al. | 159/1.1 |
| 1,915,240 | 6/1933 | Putnam | 210/667 |
| 2,977,214 | 3/1961 | McLellan | 210/864.04 |
| 3,342,731 | 9/1967 | Baumann et al. | 210/721 |
| 3,909,410 | 9/1975 | Neukamm | 210/71 |
| 3,960,725 | 6/1976 | Bjermo et al. | 210/770 |
| 3,961,903 | 6/1976 | Nielsen et al. | 23/262 |
| 4,097,378 | 6/1978 | St. Clair | 210/770 |
| 4,321,151 | 3/1982 | McMullen | 210/769 |
| 4,667,609 | 5/1987 | Hardison et al. | 110/235 |
| 4,758,268 | 7/1988 | Bishop et al. | 75/25 |
| 4,872,998 | 10/1989 | Dausman et al. | 210/710 |

Primary Examiner—Denise L. Gromada
Attorney, Agent, or Firm—Klarquist Sparkman Campbell Leigh & Whinston

[57] ABSTRACT

A method of converting industrial, domestic or other sludge, into a pelletized or granular fertilizer, as well as a sludge converter for practicing the method. The sludge is dewatered to form sludge cake solids which are dried in a dryer, and then sorted with a sorter into a sorted product comprising oversized, undersized, and standard sized product. A portion of the sorted product is recycled for mixing and sizing in a mixer with the dewatered sludge cake solids. To control dust and odors, cyclones and a condenser remove a substantial portion of the gaseous particulate matter and condensable gases from the converter, and any remaining noncondensates are burned in the heat source flame. A waste oil burning heat source supplies heat energy to the dryer. The heat source exhaust gas by-products are filtered in a bag house using a conditioner additive, such as lime or sodium bicarbonate, which may be reclaimed and supplied to the standard sized product to serve as a pelletizing binder, to enhance the fertilizer nutrient value, or to enhance the fertilizer shelf life.

5 Claims, 3 Drawing Sheets

SLUDGE TREATMENT SYSTEM

This is a divisional of application Ser. No. 07/601,906, filed Oct. 23, 1990 now U.S. Pat. No. 5,279,637.

BACKGROUND OF THE INVENTION

The present invention relates generally to a sludge treatment system for treating sludge, such as sewage sludge received from a municipality, and more particularly to an improved sludge treatment system which produces a pelletized fertilizer or soil amendment product from the sewage sludge.

Other systems have been used to produce a pelletized product from sewer sludge. For example, U.S. Pat. No. 4,872,998 to Dausman et al. discloses an apparatus and process for forming a uniform pelletizable sludge product. The sludge is received by a holding tank which agitates the sludge to keep the solids in suspension with the liquid. The sludge is released from the holding tank through a control valve for mixing with flocculation and coagulation promoting chemicals and is then transported to a belt-type dewatering press. After the dewatering step, the sludge has 10–45% solids and is transported to a temporary storage tank. The sludge is fed from the temporary storage tank to an indirect dryer which is heated by either steam or hot oil from a boiler. Water vapor and other volatiles are driven off during the drying stage and pass from the dryer into a cyclone which removes the airborne dust. The resultant air and vapors are then pulled through a water jet scrubber to remove any remaining particles. This complete removal of all particulate matter is understood to be critical to subsequent process steps, and is believed to be a significant disadvantage of this process. The remaining particulate-free exhaust air is then passed to an odor control system. Alternatively, this remaining exhaust air may be returned to the boiler where the combustible components are ignited with the fuel used to heat the boiler. The dried sludge is fed from the indirect dryer to a storage tank or to a pelletizer. The pelletized material is then fed to a pellet storage tank. Thus, the Dausman et al. system processes the sludge without recycling of any previously heat-processed sludge.

U.S. Pat. No. 3,963,471 to Hampton discloses a method for pelletizing sewage sludge for use as a fertilizer. Sludge is dewatered by adding coagulation and flocculation chemicals thereto and then passing the mixture through a dewatering press to form sludge cake. The dewatered sludge cake is mixed with a portion of the pellets constituting the final product which are in a hot, dried state. This mixing step lowers the heat required in the dryer to produce the final product and thereby prevents formation of clinkers and ignition of the organic material in the dryer. The larger the percentage of final product returned to the mixing chamber, the smaller in size are the resultant pellets formed in the dryer.

U.S. Pat. No. 2,977,214 to McLellan discloses a method for pelletizing dried sewage sludge. The dried sludge is compacted between two compacting rollers into a rigid highly frangible sheet. A rotating breaker fragments the sheet into gross flakes or chunks. The chunks are gravity fed from the compactor to a granulator. The granulator includes two sets of corrugated granulating rollers which grind the chunks received from the compactor. A screening mechanism sorts the granulated sludge into undersized, oversized and acceptable sized granules. The undersized granules are recycled to the compactor, and the oversized granules are recycled to the granulator.

The reissued U.S. Pat. No. Re. 31,185 to Greenfield et al. discloses a process for dehydrating sewage sludges in a multistage evaporator. Oil is added to the sludge in the evaporator to yield a liquid pumpable mixture, which remains pumpable even after water removal. Vapors are removed at each stage of the multistage evaporator and used as a combustion source for the preceding step in the process. A portion of the anhydrous slurry containing sludge and the oil removed from the last stage is recycled back to a position upstream of the first stage, thereby controlling the viscosity of the evaporator feed. After the final evaporator stage, the resultant dry solids and oil are passed through a centrifuge for separation, and the separated oil is recycled. The solids from the centrifuge may be used for fertilizer or to fuel the boiler-furnace which supplies steam to the multistage evaporator.

U.S. Pat. No. 4,321,151 to McMullen discloses a process for converting sewage sludge into energy useful for operating a sewage treatment plant. Raw settled sludge is withdrawn from the treatment stream early in the process sequence to preserve the energy content of the sludge. The withdrawn sludge is dewatered, caked and fragmented for pyrolysis to produce a combustible gas which may be used to fuel a gas turbine-generator to power the plant. The combustible gas is cleaned by removing the suspended tars and oils therein. The dried feed stock is pneumatically conveyed for pyrolyzing to a combustion boiler-pyrolyzer, and a portion is diverted to a rotary mixing device or blender. In the blender, the dried feed stock is blended with residual tar, oil and char (pyrolysis by-products) produced from pyrolysis of mixed and dried feed stock. The blended stock is directed to a pelletizing unit to produce pellets one inch in diameter and one and one-half inches long. The pellets are pneumatically conveyed to a combustion zone of the boiler-pyrolyzer.

U.S. Pat. No. 3,960,725 to Bjermo et al. discloses a method of converting heavy-metal hydroxides into heavy-metal oxide powders or granules using concentration sintering. Before sintering, the sludge is dewatered and deposited on a media carrier in a 1-5 mm thick film and the film is then dried. This method is useful for eliminating the toxicity of the metal hydroxy sludge for environmental considerations.

U.S. Pat. No. 4,097,378 to St. Clair discloses a method for removing water from peat and various sludges. The sludge is mixed with oil and fed into a condenser where it is heated by direct contact with steam. Liberated uncondensed gases are routed to a conventional vent system.

U.S. Pat. No. 4,402,834 to Bastgen et al. discloses a continuous dewatering process for sludges principally involving filtration. The raw sludge is mixed with a flocculating agent in a rotary filter drum. The thickened sludge is conveyed through a filtering assembly and subjected to dewatering forces including vacuum, centrifugal, static pressure or pressure while moving along the filter surfaces.

U.S. Pat. No. 4,795,568 to Chen discloses a waste water treatment system using excessive amounts of pressurized oxygen gas to oxidize the waste water solution and increase the evaporation of waste therefrom. The oxidized liquid effluent undergoes a series of flashing steps to produce a saturated solution which crystallizes upon cooling.

U.S. Pat. No. 3,342,731 to Baumann discloses a method of dewatering fresh or digested sludges or concentrate resulting from centrifuging fresh or digested sludge. After centrifuging, the sludge is further dewatered by filtering and the dewatered sludge is then incinerated. The ash resulting from the incineration of the dewatered sludge is added to the digested sludge or fresh sludge, along with lime for improved filterability. The lime remaining after incineration of sludge that has been treated with the ash and lime may be recycled by mixing it with the fresh lime and ash to be added to the sludge.

U.S. Pat. No. 1,915,240 to Putnam discloses a sewage purification system where lime and ferric chloride are mixed with the sludge to kill bacteria, oxidize and deodorize the treated mass and to promote flocculation. The sludge is centrifuged or otherwise dewatered then dried in a sludge dryer and ground for delivery to a storage bin. The resulting dried ground sludge may be used as a fertilizer or burned as fuel in the dryer. Alternatively, instead of dewatering, drying and grinding the sludge for fertilizing or heat, the sludge may be passed directly from a dewaterer and processed through a retort to produce char or carbonized particles. This resulting char product is introduced into the raw sewage before the chemical treatment step to absorb the gases and putrescible matter and increase the speed at which the solids settle from the liquid.

U.S. Pat. No. 3,025,151 to Berg discloses a method for digesting solids separated from sewage sludge. The separated solids are mixed with a biological culture and aerated at a controlled temperature to decompose the fibrous cellulose, reduce the grease content of the sewage and remove objectionable odors from the solids. The resulting product may be pelletized for use as a fertilizer.

U.S. Pat. No. 3,676,074 to Shibayama et al. discloses a cylindrical rotary tank having an air pipe along the axis thereof. Organic materials are fed into the cylindrical tank and fermented using aerobic bacteria and thereby causing substantially no odor nuisance. The fermentation process also heats the tank to aid in drying the organic waste and produce a solid granular material which may be used as a fertilizer.

U.S. Pat. No. 4,660,628 to Solberg et al. and U.S. Pat. No. 3,800,865 to Onarheim et al. each disclose rotary heat exchangers wherein the heating or cooling medium is passed through a hollow shaft having a plurality of fins extending outwardly therefrom. The shaft is enclosed within a container which receives the moist, solid or semi-solid materials which are to be heated or cooled.

The Japanese Patent No. 5,439,372 illustrates the method of adding aluminum sulfate to waste sludge for settling, and thereafter adding a macromolecule type aggregating agent. The mixture is then centrifugally separated and the solid matter heated for solidification in a drying furnace at 200–500% C. to obtain a dried cake.

U.S. Pat. No. 3,695,432 to McCrink discloses a sewage disposal system which pumps solid wastes separated from sewage through a heating retort. The solids are mixed with a non-oxidizing gas such as ammonia, methane or propane which is injected therein under pressure, and the mixture is heated to produce a fine powdery ash. The gases produced during the process are passed through a flame curtain prior to exiting the system to remove all odors therefrom.

U.S. Pat. No. 548,561 to Lamb discloses an apparatus for making fertilizer from refuse. The refuse is filtered through sand and then evaporated using steam passing through a coil and then further dried using steam or hot air to produce a fertilizer. Odors produced by this system are conducted to the furnace for destruction therein.

U.S. Pat. No. 659,503 to Wood discloses a sewage treating apparatus which receives sludge solids in a vibrating and oscillating hopper comprising a filter-bed holder. Water is removed by the vibrating and oscillating hopper, and the resulting solids entrapped therein pass to a drying cylinder F where the material is thoroughly dried and granulated by heating and revolving the drying cylinder to produce a fertilizer.

U.S. Pat. No. 3,909,410 to Neukamm discloses a sewage sludge treating process wherein the sludge slurry is continuously distributed in a rotating contactor drum onto preheated aggregate pieces which are continually fed into the drum. A portion of the slurry instantaneously adheres to the heated aggregate and the non-adhering slurry exits the drum for recycling. The coated aggregate is collected from the drum and heated during travel to a tumbler drum. In the tumbler drum, the sludge coating is broken away from the aggregate and pulverized into a powder or dust which is the product. The decoated aggregate is recycled into the rotating contactor drum.

None of the above sewage treatment systems are understood to process the sewage sludge into a pelletized fertilizer having a long shelf life, such as on the order of seven months. Furthermore, none of these known systems are understood to make use of waste oil, such as transformer oil, crankcase oil, and other reclaimed oil in a heating stage of the sewage treatment process without venting significantly detectable amounts of gaseous pollutants thereby produced to atmosphere. Furthermore, none of the above sewage treatment systems are understood to fulfill such deficiencies with a minimal odor dispersing apparatus which may be used in a urban setting.

Thus, a need exists for an improved sludge treatment system for pelletizing sewage sludge, such as may be used to produce a pelletized fertilizer or soil amendment product, which is not susceptible to the above limitations and disadvantages.

SUMMARY OF THE INVENTION

It is an overall object of the present invention to provide an improved sludge treatment system comprising a method and an apparatus for processing sludge, such as waste water sludge into a pelletized fertilizer.

A further object of the present invention is to provide an improved fertilizer product made from a processed waste water sludge, with the fertilizer product having an improved shelf life.

An additional object of the present invention is to provide a sludge treatment system which makes use of waste fuel, such as transformer oil, crankcase oil and other reclaimed oil, and which does not pollute the atmosphere.

A further object of the present invention is to provide an improved material handling system for use in a sludge treatment system.

Another object of the present invention is to provide a sludge treatment system which may be used in an urban setting.

Still another object of the present invention is to provide a sludge treatment system which is economical to operate and which produces a profitable final product.

Yet another object of the present invention is to provide an improved sludge treatment system capable of producing a pelletized fertilizer from digested sludge, raw sludge, waste-activated sludge, and a mixture of raw sludge and waste-activated sludge.

A further object of the present invention is to provide an improved sludge treatment system which produces a pelletized fertilizer meeting EPA (the Environmental Protection Agency) requirements relating to vector attraction reduction and pathogen indicator organism density for Class A sludge.

An additional object of the present invention is to produce from waste water sludge a pelletized fertilizer having a nutrient value high in nitrogen and phosphorous.

Yet another object of the present invention is to produce from waste water sludge a pelletized fertilizer and to convert undesirable by-products in exhaust gases produced by a heat source during this production into a desirable fertilizer component having a beneficial nutrient value.

According to one aspect of the present invention, a method is provided of converting sludge into fertilizer including the steps of mixing and sizing dewatered sludge cake solids with a recycled portion of sorted product to produce a solids mixture. In a drying step, the solids mixture is dried in a dryer to produce a dried solids. In a sorting step, the dried solids are sorted into a sorted product comprising oversize product, undersized product, and standard sized product. In a recycling step, the oversized product is recycled to serve as the recycled portion of sorted product in the mixing and sizing step. In an adding step, lime is added to the standard sized product so as to produce a fertilizer from the standard sized product having an enhanced shelf life.

According to another aspect of the present invention a method of converting sludge into fertilizer includes the mixing and sizing, drying, sorting and recycling steps as described above. This method also includes the step of providing heat energy to the dryer from a heat source. In a fueling step, the heat source is fueled with waste oil to produce the heat energy, and during the heat energy production the heat source also producing an exhaust gas containing undesirable by-products. In a filtering step, the undesirable by-products from the exhaust gas are filtered with a bag house prior to discharging the exhaust gas to atmosphere.

In an illustrated embodiment, prior to discharge to atmosphere, the exhaust gas from the filtering step may be used in preheating steps. Also, the undesirable by-products from the fueling step are converted during the filtering step into a desirable fertilizer component having a beneficial nutrient value.

According to a further aspect of the present invention, a method of converting sludge into fertilizer includes the step of dewatering sludge to produce dewatered sludge solids. The method also includes the steps of drying the dewatered sludge solids in a dryer to produce dried solids, and providing heat energy to the dryer from a heat source. The method includes fueling and filtering steps, which may be as described above. In a conditioning step, the exhaust gas is conditioned by adding a conditioner additive thereto to aid in the collection of the undesirable by-products in the bag house and to facilitate removal of the collected by-products from the bag house.

In an illustrated embodiment, the conditioner additive comprises sodium bicarbonate. With sodium bicarbonate as the conditioning additive, the method may also include the steps of adding either flyash or Portland Cement to the dried solids to serve as a binder, with the method furthering including a step of pelletizing the dried solids after the flyash or Portland Cement has been added thereto. In an alternative embodiment, the conditioning additive may be lime.

According to yet another aspect of the present invention, a method of converting sludge into fertilizer includes the mixing and sizing steps as described above. In a drying step, during the drying of the solids mixture a dryer vapor is produced having condensable and noncondensable vapors and particulate matter therein. The dried solids produced in the drying step are sorted in a sorting step into oversized product, undersized product and standard sized product, and in a recycling step, at least a portion of the sorted product is recycled for use in the mixing and sizing step. Additionally, in a separating step, a substantial portion of the particulate matter from the dryer vapor is separated from the other vapors. In a condensing step, the dryer vapor is condensed to remove a substantial portion of the condensable vapors therefrom. In a destroying step, the noncondensable vapors, as well as any condensable vapors or particulate matter, remaining in the dryer vapor after the separating and condensing steps are destroyed through combustion at a temperature of substantially at least 1700° F. in the heat source by containing the vapors and matter in the heat source for at least approximately one to two seconds. In this manner, the escape of odors from the system is minimized.

In an illustrated embodiment, the destroying step comprises the steps of combusting the dryer noncondensable vapors, as well as any remaining condensable vapors and particulate matter, using a heat source with a firebox heated by a burner having a flame with a prompt flame zone. In a providing step, fuel and primary air are provided to the burner for combustion. In a supplementing step, the primary air is supplemented with the dryer noncondensable vapors by injecting the noncondensable vapors, as well as any remaining condensable vapors and particulate matter, into the firebox substantially at the prompt flame zone.

According to a further aspect of the present invention, a method of converting sludge into fertilizer includes the steps of promoting flocculation and coagulation of the sludge by adding a polymer to the sludge. In a dewatering step, the sludge is dewatered after the polymer has been added thereto to provide dewatered sludge solids. In a drying step, the dewatered sludge solids are dried in a dryer to produce dried solids. In an adding step, lime is added to the dried solids to produce a fertilizer therefrom having an enhanced shelf life.

According to an additional aspect of the present invention, a sludge converter is provided for converting sludge into a fertilizer. The sludge converter includes a mixer which receives and mixes dewatered sludge cake solids and a recycled portion of sorted product to produce a solids mixture. A dryer receives and dries the solids mixture to produce dried solids. A sorter receives and sorts the dried solids into a sorted product comprising oversized product, undersized product and standard sized product. A screw conveyor receives the standard sized product and has a product outlet and a recycle outlet. The product outlet is in communication with storage means for storing the standard sized product. A recycling screw conveyor is in communication with the recycle outlet of the product screw conveyor. The recycling screw conveyor operates to recycle a portion of the standard sized product to the mixer to serve as the recycled portion of sorted product.

In an illustrated embodiment, the sludge converter includes a recycle controller responsive to sensors, analyzers and other meters which produce a dewatered sludge cake solid signal, a dried solids moisture signal, a dryer temperature signal, a dried solids temperature signal, and a horsepower signal which indicates the consistency of the sludge within the dryer. The recycle controller processes all of these signals and in response thereto produces a recycle conveyor controller signal. The recycling screw conveyor operates in response to the recycle control conveyor signal. The sludge converter may also include a heat source which supplies heat energy to the dryer and produces an exhaust gas containing undesirable by-products. To remove these by-products from the exhaust gas prior to venting to atmosphere, the sludge converter also includes a bag house which receives and filters the heat source exhaust gas. During operation, the dryer produces condensable and noncondensable vapors and particulate matter. To remove these dryer by-products, the sludge converter may also include a cyclone which receives the dryer vapor from the dryer and separates a substantial portion of the particulate matter therefrom. A condenser in communication with the cyclone and the heat source is provided for condensing a substantial portion of the condensable vapors from the exhaust gas. The heat source receives the noncondensable vapors, as well as any remaining condensable vapors and particulate matter, from the condenser and combusts these vapors and matter at a temperature of substantially 1700° F. by retaining them within the heat source for at least approximately one to two seconds.

The present invention relates to the above features and objects individually as well as collectively.

These and other objects, features and advantages of the present invention will become apparent to those skilled in the art from the following description and drawings.

DETAILED DESCRIPTION OF A PREFERRED EMBODIMENT

Figure 1:
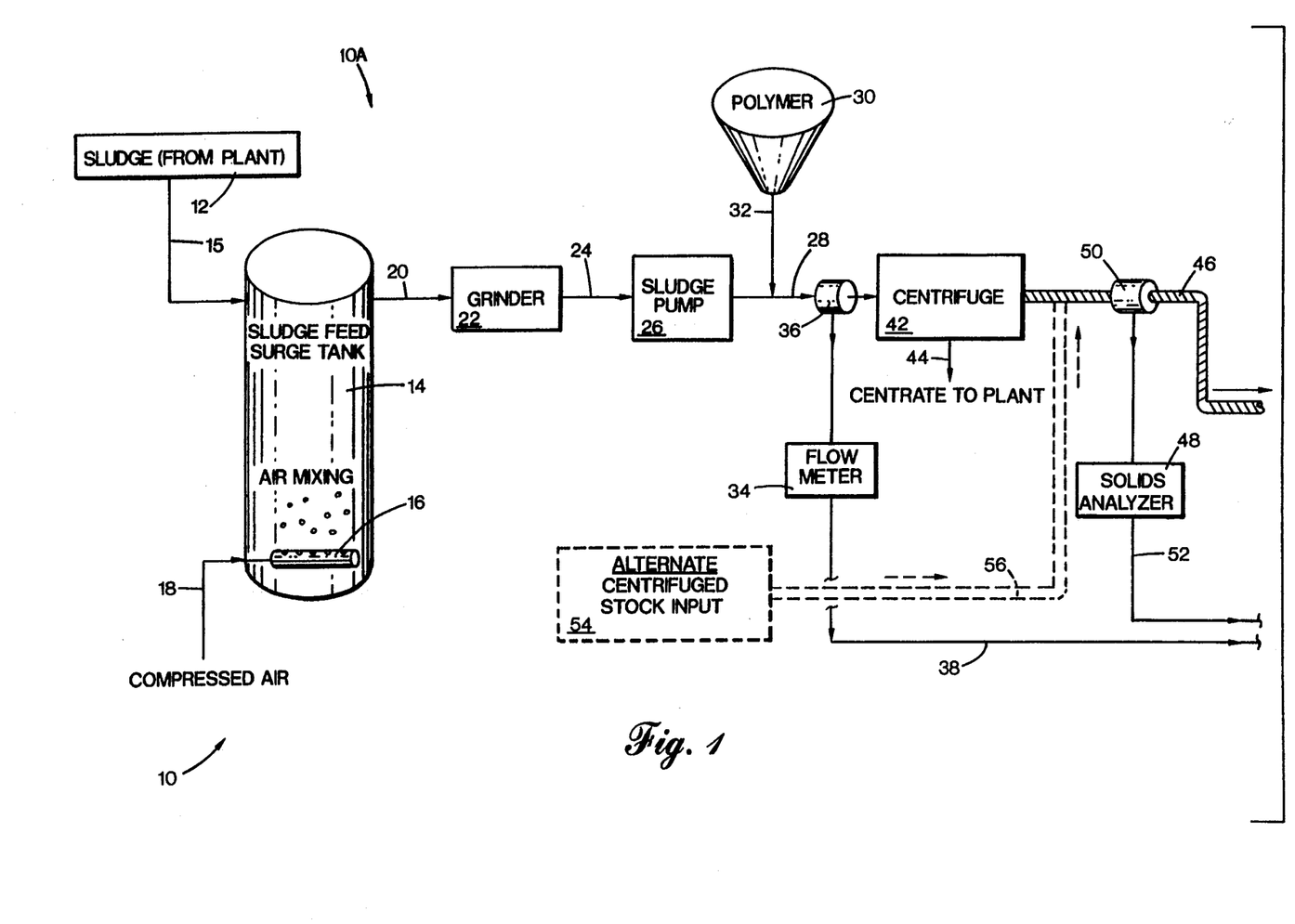
FIGS. 1 through 3 are portions of a schematic flow diagram which may be interconnected in a side-by-side fashion, with FIG. 1 on the left, FIG. 2 in the middle, and FIG. 3 on the right, to illustrate one form of a sludge treatment system according to the present invention.
Figure 2:
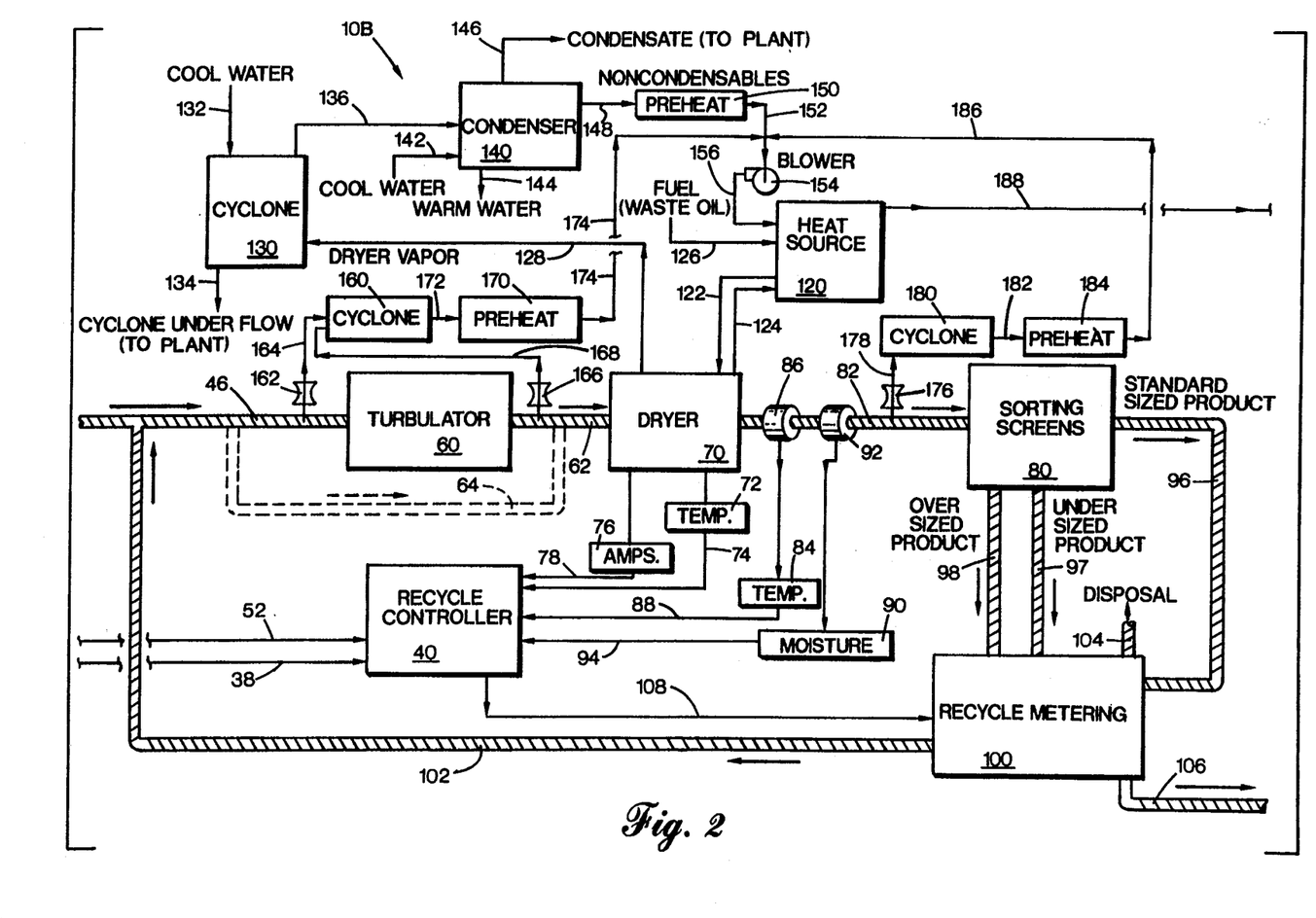
Figure 3:
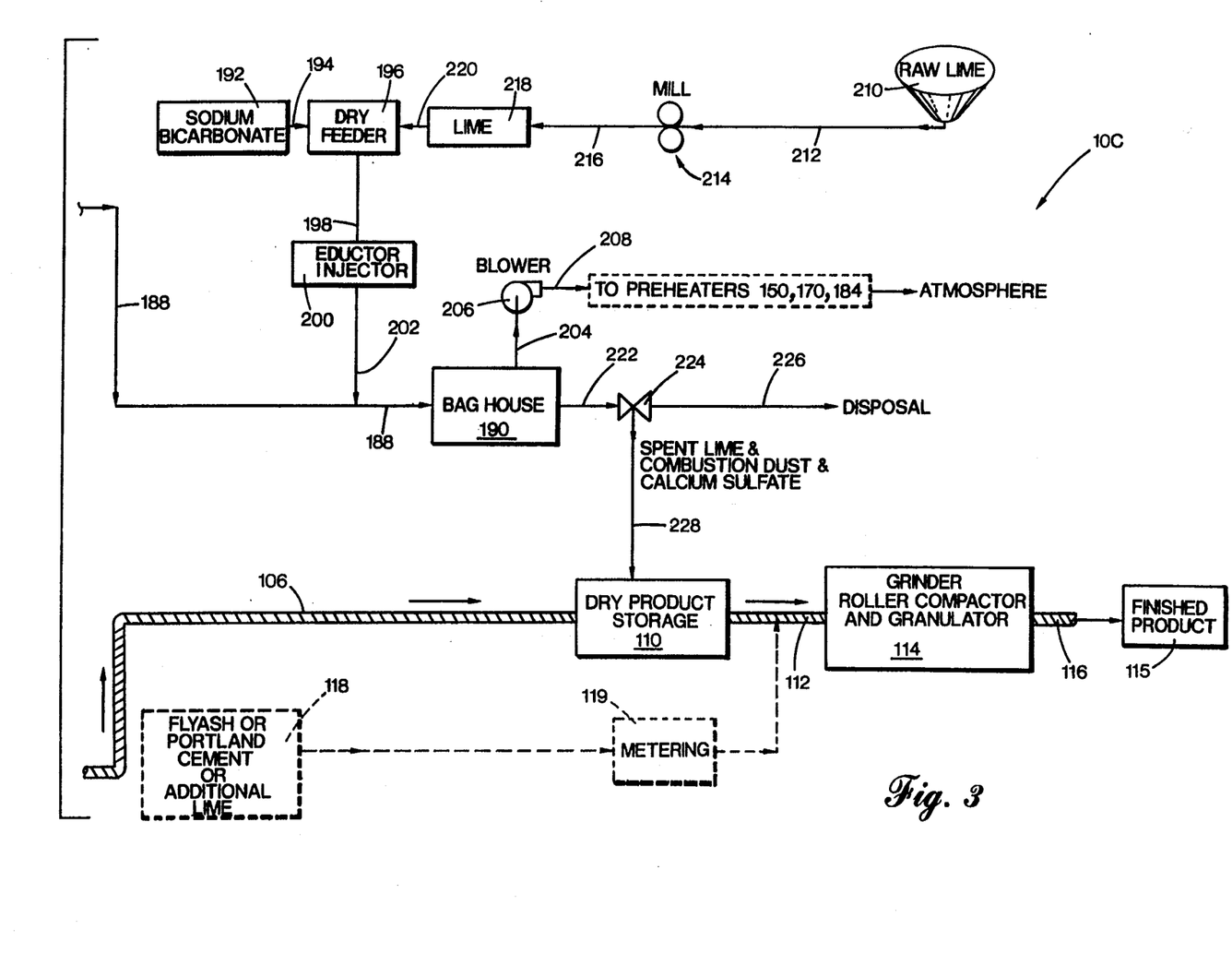

FIGS. 1 through 3 collectively illustrate an embodiment of a sludge treatment system or sludge converter 10 constructed in accordance with the present invention for converting sludge, such as waste water sludge 12, into a fertilizer or soil amendment product. The sludge 12 may be, for example, digested sludge, raw sludge, waste-activated sludge, or a mixture of raw sludge and waste-activated sludge. The digested sludge may be aerobically or anaerobically digested sludge. The digested and the raw sludge may be, for example, primary, secondary or tertiary sludge. For convenience, the sludge converter 10 is illustrated by interconnecting FIGS. 1-3 side to side, with a first portion of the sludge converter designated 10A shown in FIG. 1, an intermediate portion 10B being shown in FIG. 2, and a final portion 10C being shown in FIG. 3, such that the combination of items 10A, 10B and 10C illustrate a preferred embodiment of sludge converter 10.

The sludge 12, typically containing 3 to 6% of solids, may be received from a sludge generating entity, such as a municipality or metropolitan area, or an industrial waste water plant, for example in the paper industry. The sludge generating entity from which sludge 12 is received hereinafter is designated as the "plant." A prototype sludge converter 10 was constructed in accordance with the present invention. Examples of the sludge converter components given herein are applicable to this prototype system. However, it will be apparent to those skilled in the art that suitable component substitutions may be made, for example to implement this system in accordance with the present invention on a larger scale.

A sludge feed surge tank 14 receives the sludge 12 from the plant through a conduit 15. Tank 14 includes a sludge agitator or mixer 16, which agitates the sludge by air mixing using compressed air received through conduit 18. A suitable sludge mixer 16 is sold under the trade name "Lightnin Mixer", Model XJ174, manufactured by Mixing Equipment Company of Avon, N.Y. 14414. The sludge flows through conduit 20 into a grinder 22 for grinding. A suitable grinder 22 is sold under the trade name "Muffin Monster," Model No. 3-8-4, and is manufactured by Disposable Waste Systems, Inc., Santa Ana, Calif. 92707. The sludge is pumped from grinder 22 through conduit 24 by a sludge pump 26. A suitable sludge pump is sold under the trade name "Moyno," Model 1L8, manufactured by MGI Pumps, Inc. of Bentsenville, Ill. 60106.

The sludge exits pump 26 through conduit 28, which has a T-fitting for receiving a polymer 30 through conduit 32. The polymer 30 may be of the type which promotes coagulation and flocculation of the sludge. A flow meter 34 has a transducer 36 monitoring the sludge flow within conduit 28. The flow meter 34 produces a flow meter signal 38 in response to the flow through conduit 28 monitored by transducer 36. The flow meter signal 38 is received by a recycle controller 40 (see FIG. 2). The recycle controller 40 receives a plurality of sensor and monitor signals, which will be described further below along with the manner in which the recycle controller 40 operates.

Dewatering means, such as a dewaterer which may be a centrifuge 42, receives the sludge having polymer 30 therein from conduit 28. A variety of suitable dewatering devices are known in the art. The prototype of sludge converter 10 was constructed using a centrifuge sold under the trade name "Bird," Model No. 2500, which in the prototype was a mobile completely self-contained test truck facility, manufactured by Bird Machine Company of South Walpole, Mass. 02071. The centrifuge 42 produces sludge cake solids and centrate. The centrate is delivered back to the plant through conduit 44. Of the total recycle return load or stream to the plant produced in the prototype sludge converter 10, approximately 85% was produced by the centrifuge 42. The sludge cake solids produced by centrifuge 42 in the prototype unit averaged from 26–32% total solids consuming 7–15 pounds per ton of polymer with 95–96% recovery of feed solids. The dewatering operation performed by centrifuge 42 provides a consistent sludge production for an input to the balance of the sludge converter 10.

The sludge cake solids exit centrifuge 42 through a turbulator feed conveyor 46, which may be an enclosed shaftless screw conveyor. A suitable shaftless screw conveyor may be obtained from Purac Engineering, Inc. of Wilmington, Del. 19808. Several other screw conveyors are described further below and such screw conveyors may also be of the shaftless variety such as those supplied by Purac Engineering, Inc. A solids analyzer 48 monitors the flow of the sludge cake solids through conveyor 46 using transducer 50. The solids analyzer 48 produces a dewatered sludge cake solids signal 52 in response to the percentage of solids monitored by transducer 50. The recycle controller 40 also receives the dewatered sludge cake solids signal 52. A suitable solids analyzer 48 may be obtained from Texas Nuclear of Austin, Tex., such as the TN Mark II Series SGD Density Gauge.

Alternatively, instead of receiving sludge 12 from the plant, the plant may provide dewatered sludge cake solids or a centrifuged stock input 54. The centrifuged stock input 54 may be delivered through an alternate turbulator feed conveyor 56 to conveyor 46. The intersection of conveyors 46 and 56 is shown schematically as a T-coupling to illustrate the principle that solids analyzer 48 would monitor and measure the percent solids received from the alternate source 54. If the alternate centrifuged stock input 54 is received on a permanent basis, then the above-described system upstream from the turbulator feed conveyor 46, comprising items 12 through 44, would not be required.

Referring now to FIG. 2, the sludge cake solids are received from the turbulator feed conveyor 46 by sizing and mixing means, such as a sizing and mixing turbulator or mixer 60. The prototype unit used a model 14T41-04 turbulator manufactured by Ferro-Tech of Wyandotte, Mich. 48192. The turbulator 60 serves to further mix and densify the centrifuge cake. A solids mixture produced by the turbulator 60 exits through a dryer feed conveyor 62, which may be an enclosed shaftless screw conveyor. An optional turbulator by-pass conveyor 64, which may be an enclosed shaftless screw conveyor, interconnects the turbulator feed conveyor 46 with the dryer feed conveyor 62.

A dryer 70 receives the solids mixture from conveyor 62. A suitable dryer 70 is sold under the trade name "Rotadisc," Model No. TST1.0, manufactured by Stord, inc. of Greensboro, N.C. 27409. This type of dryer has a sludge drying chamber with a hollow shaft rotatably mounted therethrough. The dryer 70 includes a motor (not shown) for driving the dryer by rotating the hollow shaft within the chamber. The hollow shaft has a plurality of hollow vanes extending outwardly therefrom and into the chamber to agitate the mixture during drying. A heating medium, such as steam or oil may be circulated through the hollow shaft and vanes while the shaft rotates, to dry the solids mixture to produce dried solids. A dryer 70 which operates at various temperatures is advantageous in drying fibrous raw sludges. For example, with a dryer 70 using oil as the heating medium, successful operation of the prototype system occurred at inlet oil temperatures of 350°–500° F.

The temperature of dryer 70 is monitored by a dryer temperature sensor 72. The dryer temperature sensor 72 produces a dryer temperature signal 74 in response to the temperature sensed within dryer 70. The recycle controller 40 receives the dryer temperature signal 74. The drying action within dryer 70 may be monitored by measuring the amount of horsepower required by the dryer motor (not shown) to rotate the dryer shaft. To do this, an ammeter 76 measures the current in amperes or amps drawn by the motor. The ammeter 76 produces a horsepower signal 78 in response to the sensed dryer motor amperage. The recycle controller 40 receives the horsepower signal 78 from ammeter 76.

A sorter, such as a sorting device comprising sorting screens 80, receives the dried solids from dryer 70 through a dryer exit or sorter feed conveyor 82. The sorter feed conveyor 82 may be a screw conveyor, such as an enclosed shaftless screw conveyor. The temperature of the dried solids is measured by a dryer exit temperature sensor 84 having a transducer 86 monitoring the temperature within conveyor 82. The dryer exit temperature sensor 84 produces a dried solids temperature signal 88 in response to the temperature of the dried solids exiting the dryer 70 through conveyor 82.

A moisture analyzer 90 includes a transducer 92 which senses and monitors the moisture content of the dried solids in conveyor 82. The moisture analyzer 90 produces a dried solids moisture signal 94 in response to the moisture content of the dried solids measured by transducer 92 in conveyor 82. The recycle controller 40 receives the dried solids moisture signal 94 from the moisture analyzer 90.

The sorting screens 80 receive and sort the dried solids into a sorted product comprising: standard sized product which exits the screens through a standard sized product conveyor 96; undersized product which exits the screens through an undersized product conveyor 97; and oversized product which exits the screens through an oversized product conveyor 98. One suitable sorting device is sold under the trade name "SWECO Vibro-Energy Separator," Model No. L5245444-3, manufactured by SWECO of Florence, Ky. 41022. Conveyors 96, 97 and 98 may be screw conveyors, such as shaftless screw conveyors.

The conveyors 96, 97 and 98 deliver the respective standard, undersized and oversized product to a recycle metering device 100. The recycle metering device 100 may select one or all of the dried standard sized, undersized and oversized product to be recycled through a turbulator recycle feed conveyor 102 which may be a screw conveyor, such as an enclosed shaftless screw conveyor. For example, during start-up of the sludge converter 10, all of the dried product sized may be recycled. The turbulator recycle feed conveyor 102 joins the turbulator feed conveyor 46. Thus, in the illustrated embodiment having this recycle loop, the turbulator 60 mixes the dewatered sludge cake solids with a recycled portion of the dried sorted product from the recycle metering device 100, to produce the solids mixture.

The recycle metering device 100 typically recycles the undersized and oversized product through conveyor 102, and passes the standard sized product through a dry product storage feed conveyor 106, which may be a screw conveyor, such as an enclosed shaftless screw conveyor. Alternatively, the recycle metering device 100 may direct the undersized or oversized product to a disposal feed conveyor 104, to deliver such product to a collection point for later disposal.

The recycle metering device 100 responds to a recycle metering or conveyor control signal 108 from the recycle controller 40. The recycle controller 40 may be of any type of an analog or digital device, such as a microprocessor. Such a recycle controller microprocessor 40 receives the dewatered sludge cake solids signal 52, the dryer temperature signal 74, the dried solids moisture signal 94, the dried solids temperature signal 88, and the horsepower signal 78. The controller 40 processes all of these received signals according to a control logic preprogrammed therein, and in response thereto produces the controller signal 108. The controller 40 operates to maintain optimum operating conditions in the turbulator, for example, to keep the consistency of the mixture therein within desired limits, such as not too gummy or gluey.

Referring now to FIG. 3, conveyor 106 delivers the standard sized product to a dry product storage container 110. During the prototype testing phase, three types of sludges were processed, i.e., digested sludge, raw sludge, and a mixture of waste-activated sludge and raw sludge. The final dried product produced using the digested sludge, which may be either aerobically or anaerobically digested, was granular in nature so that it could be used as a final product without further processing. Digestion reduces the fiber content of the sludge which allows sufficient agglomeration to take place to produce this dried granular product. In contrast, the raw sludge and a 50:50 mixture of raw sludge with waste-activated sludge was converted into a fluffy dried product by the sludge converter 10. This fluffy dried product requires further treatment, such as pelletizing described below, to produce a desired final product. The waste-activated sludge should also require pelletizing, although no testing was performed during the prototype run.

Thus, if the sludge converter 10 receives raw sludge, waste-activated sludge, or a mixture of raw sludge and waste-activated sludge, an additional pelletizing step is required to produce the finished product. In this embodiment, a pelletizing conveyor 112, which may be a shaftless screw conveyor, delivers the standard sized product from the dry product storage container 110 to a pelletizing device 114. The pelletizing device 114 may include a grinder, roller compactor and granulator for compacting the standard sized product into a finished product. A suitable pelletizing device 114 is manufactured by BEPEX of Minneapolis, Minn. 55413, with the grinder portion sold under the trade name "Pulvocron Primary Grinder," Model No. P20; the compactor portion sold under the trade name "Labpactor Compactor," Model No. L200/50; and the granulator portion sold under the trade name "Frewitt Granulator," Model No. MG800. A finished product 115 may exit the pelletizing device 114 through a screw conveyor 116, or through a chute or other material transfer device. The finished product 115 may be delivered to finished product storage (not shown), to a vehicle (not shown) for immediate spreading as fertilizer, or to a packaging apparatus (not shown), such as for bagging the finished product 115.

To aid in the pelletizing operation, an additional material, such as flyash or Portland Cement or lime, indicated as item 118, may be added to the pelletizing feed conveyor 112 through a metering device 119 as required. The flyash, Portland Cement or lime may serve as a binder to hold the compacted product into the pelletized form provided by the pelletizing device 114.

Referring again to FIG. 2, a dryer heating and air handling system will be described. The dryer 70 receives heat energy in the form of a heating medium, such as steam or hot oil, from a heat source 120 via conduit 122. A return path for the heating medium from the dryer to the heat source 120 is provided by conduit 124. A variety of different types of devices are suitable to serve as the heat source 120 for use in the sludge converter 10.

For example, the heat source 120 may comprise a steam generating boiler, with steam serving as the heating medium. A suitable boiler may be obtained from Cleaver Brooks of Milwaukie, Wis. 53201, under the trade name "CB Packaged Boiler," Model No. 15HP. Alternatively, the heat source 120 may be a thermal liquid heater, such as an oil heater with oil serving as the heating medium. A suitable oil heater may be obtained from American Hydrotherm Corporation of New York, N.Y. 10016, under the trade name of "Hydrotherm Thermal Liquid Heater," model no. 25-2-24. Both of these heat sources generate the heat by combustion of fuel, and are particularly advantageously capable of burning waste oil, such as transformer oil, crankcase oil, or other reclaimed oil. This fuel is received by the heat source 120 through conduit 126. The combustion flame may advantageously be used for the thermal destruction of noncondensable gases and particles produced during the drying and conveying processes in a manner discussed further below.

The heat source 120 used in the prototype was an oil heater supplied with the Stord brand dryer 70, so the heat energy was supplied to the dryer via a hot oil medium. The prototype also had a boiler and a thermal destruction unit (TDU) which were alternately run during testing to thermally destroy noncondensable gases and particles, mentioned above and discussed in detail below. The boiler and TDU each provided a flame for the thermally destroying such noncondensates. In a permanent installation, a TDU may advantageously provide the flame for thermally destroying noncondensables when using a non-combustion heat source 120, such as an electric oil heater. The prototype boiler was a conventional, hot water boiler manufactured by Rite Engineering and Manufacturing Company of Downey, Calif. 90211. To facilitate combustion of the waste oil, a special burner was installed in the Rite boiler. This special burner is sold under the trade name "Clean Burn Air Atomizer," model no. 85 HS, manufactured by Clean Burn, Inc. of Leola, Pa. 17540. The Clean Burn air atomizer used both a pressurized oil feed and compressed air to form a final oil spray.

During drying, the dryer 70 produces a dryer vapor comprising condensable and noncondensable vapors, as well as particulate matter. A conduit 128 delivers the dryer vapor from dryer 70 to a main cyclone 130. A suitable cyclone is sold under the trade name "High Efficiency Wet Cyclone," Model No. CY-230-8, manufactured by Stord, Inc. of Greensboro, N.C. 27409. The cyclone 130 serves as a dust removal device to separate and remove a substantial portion of the particulate matter from the dryer vapor. The cyclone 130 also aids in condensing of the vapor gases. The cyclone 130 draws a vacuum on the conduit 128 to withdraw the dryer vapor from the dryer, and to provide a negative pressure within the dryer 70. The running the dryer 70 at a negative pressure advantageously aids in odor control and minimizes the escape of particulate matter to the surrounding environment.

The particular Stord brand cyclone used in the prototype system was a wet cyclone which was modified by adding additional water injection nozzles. The nozzles swept the cyclone interior walls, promoting greater steam condensation and keeping the cyclone interior clean. In the prototype cyclone, two water injection nozzles (not shown) were used which received cool water through conduit 132. The flow and pressure of the water was metered (not shown). The cyclone under flow is delivered by conduit 134 to the plant.

A conduit 136 delivers the remaining dryer vapor comprising condensable and noncondensable vapors, as well as any remaining particulate matter, to a condenser 140. The condenser 140 receives cool water through conduit 142 which is used to condense and remove a substantial portion of the condensable vapors from the dryer vapor. The warm water produced during the condensing step leaves the condenser through conduit 144. The condensate containing the condensed components of the condensable vapors are delivered form the condenser 140 to the plant through conduit 146. A suitable condenser 140 is a tube and shell heat exchanger, such as the shell tube cooler sold under the trade name "Heat Exchanger," Model No. FTSSX-66, manufactured by Stord, Inc. of Greensboro, N.C. 27409.

After condensing, the remaining dryer vapor noncondensate, comprising noncondensable vapors, as well as any remaining condensable vapors and particulate matter, may be delivered through a conduit 148 to a preheating device or preheater 150. A conduit 152 delivers this preheated remaining noncondensate to a blower unit or blower 154. The blower 154 also serves to draw the noncondensate from condenser 140. A conduit 156 delivers the noncondensate from blower 154 to the heat source 120. In the prototype for the sludge converter 10, a Stord mobile trailer test facility, Model No. TST-1 mobile dryer unit supplied by Stord Bartz Americas, Inc. of Greensboro, N.C. 27409, was used. This mobile unit was a totally self-contained processing plant and included the dryer 70, the oil heater portion of the heat source 120 for supplying hot oil to the dryer as the heat energy, the cyclone 130, the condenser 140 and the blower 154 each in communication with one another as described above.

The noncondensate, which may include compounds having foul-smelling odors, is destroyed through combustion in the heat source 120. The combustion takes place in the TDU if used. Otherwise, the combustion takes place in the firebox of the portion of the heat source which heats the heating medium. Substantially total destruction of the noncondensate in the prototype TDU was accomplished by combusting the noncondensables at a temperature of at least 1700° F. and by containing the noncondensate within the TDU for at least approximately one to two seconds. The destruction of the noncondensate is particularly advantageous for a sludge converter 10 used in an industrial or urban setting, since the noncondensate typically comprises a variety of foul-smelling compounds. Thus, the escape of odors associated with the noncondensate from the sludge converter 10 is minimized using this odor control system.

The odor control system of the present invention also includes several auxiliary cyclones which may be located along the various conveyors to provide a negative pressure within the enclosed conveyor system. The negative pressure enclosed conveyor system serves to draw particulate containing odorous vapor from the conveyors for disposal. In this manner, a relatively clean and a minimal odor dispersing sludge converter system 10 is provided which is compatible with an urban or industrial environment.

For example, an eductor-driven wet mixer cyclone 160 draws the particulate-containing sludge cake vapor from the dewatered sludge cake solids within the turbulator feed conveyor 46. An eductor 162 removes these vapors from conveyor 46 and delivers them through conduit 164 to cyclone 160. The mixer cyclone 160 may also receive particulate-containing vapors from the solid mixture exiting the turbulator 60 through the dryer feed conveyor 62. An eductor 166 removes these vapors from conveyor 62 and delivers them through conduit 168 to cyclone 160. It is apparent that a separate mixer exit cyclone (not shown) may be included to receive the vapors drawn from conveyor 62 by eductor 166. The mixer cyclone 160 functions in a similar fashion to the main cyclone 130 to remove a substantial portion of the particulate matter from the vapors received from conduits 164 and 166. The cyclone 160 has a cool water supply (not shown) and may deliver the mixer cyclone under flow to the plant (not shown), in the manner described above for the main cyclone 130.

The remaining condensable and noncondensable vapors, as well as any remaining particulate matter, are delivered to a preheating device 170 from cyclone 160 through conduit 172. The preheating device 170 serves to prevent condensation of the vapors during travel through a conduit 174 which joins conduit 152 to deliver these vapors to the heat source 120.

An eductor 176 draws particulate-containing vapors from the conveyor 82 exiting the dryer 70 and delivers these vapors through conduit 178 to a dryer exit cyclone 180. The dryer exit cyclone 180 may operate in the same manner as described above for the mixer cyclone 160 to remove a substantial portion of particulate matter from these vapors. A conduit 182 delivers the condensable and noncondensable vapors, as well as any remaining particulate matter, from cyclone 180 to a preheating device 184. The preheating device 184 serves to prevent condensation of the vapors during travel through a conduit 186 which joins conduit 152 to deliver the vapors to the heat source 120. Thus, running the enclosed conveyors 46, 62 and 82 at a negative pressure advantageously aids in odor control and minimizes the escape of particulate matter to the surrounding environment.

Most other known heat source burners have a fan which forces air into the heat source firebox through a plurality of air inlet apertures around the fuel nozzle. A burner flame has a prompt flame zone near the fuel nozzle where combustion originates, and a late flame zone near the tip of the flame. These known systems supply the noncondensable vapors to the fire box in the late flame zone to avoid clogging of the air inlet apertures, as well as fouling of the fan, and to prevent corruption of the flame. However, supplying these vapors, which are often cool, to the late flame zone disadvantageously quenches the flame. This quenching of the flame requires more fuel to be supplied to the burner to adequately maintain the flame to heat the heating medium. More inlet air for combustion of the additional fuel must also be supplied and of course heated by the flame, requiring yet more fuel.

The burner of the present invention combusts the dryer noncondensable vapors, as well as any remaining condensable vapors and particulate matter, by injecting these confined vapors and matter into the prompt flame zone. These vapors and matter are a secondary air source which supplements the primary air delivered by the burner fan to the fire box. By preheating noncondensable vapors, as well as any remaining condensable vapors and particulate matter, with preheaters 150, 170 and 184, fouling of the fan is substantially eliminated. Furthermore, by using a burner having a substantially unrestricted air inlet around the fuel nozzle, clogging of the air inlet is substantially eliminated. A suitable burner for heat source 120 may be obtained by modifying one of several similar burners readily available in the marketplace.

Thus, these confined vapors and matter may be injected into the firebox, for example with the primary inlet air, substantially at the prompt flame zone, advantageously conserving fuel. Burning the confined vapors and matter in the prompt flame zone advantageously provides more complete destruction than injection in the late flame zone because the prompt flame zone is at a higher temperature. As a further odor control measure, the primary inlet air may be collected from an enclosure or building surrounding the sludge converter 10, thereby destroying a portion of any fugitive odorous compounds escaping from the various equipment described herein of the sludge converter 10.

During combustion of the waste oil fuel and vapors, the heat source 120 produces an exhaust gas comprising undesirable by-products, such as by-products containing sulfur which may be in a gaseous state. To purify the heat source exhaust gas, the sludge converter 10 includes an air cleaning system. A conduit 188 delivers the heat source exhaust gases from the heat source 120 to a bag house 190 (see FIG. 3). A suitable bag house may be obtained from Hosokawa Micro of Summit, N.J. 07901, under the trade name "Pulse-Jet Bag House," Model 4B.

To aid in the air cleaning process, a conditioner additive, such as sodium bicarbonate 192, may be added to the heat source exhaust gas. A conduit 194 delivers the sodium bicarbonate to a dry feeder 196. A suitable dry feeder is sold under the trade name "AccuRate Dry Material Feeder," Model No. 302, manufactured by AccuRate, of Whitewater, Wis. 53190. A conduit 198 delivers the sodium bicarbonate from the dry feeder 196 to an eductor injector 200. Via a conduit 202, the eductor injector 200 distributes the sodium bicarbonate into the heat source exhaust gas stream flowing in conduit 188.

The bag house 190 filters the undesirable by-products from the heat source exhaust gas, and then discharges the now clean exhaust gas from conduit 204 and blower 206 and through a conduit 208 to atmosphere. Alternatively, before venting or discharging the clean exhaust gas to atmosphere, this gas may be used as a preheating heat source in the preheaters 150, 170 and 184. The clean exhaust gas is routed through conduits (not shown) in communication with conduit 208 and the preheaters 150, 170 and 184, and after assisting in the preheating step, is then vented to atmosphere.

Alternatively, the conditioner additive added to the heat source exhaust gas may be lime 210, which is initially supplied to the sludge converter 10 as raw bulk lime in the illustrated embodiment. The raw lime is delivered through conduit 212 to a mill 214 where it is ground into a fine powder. Conduit 216 delivers the ground lime to a lime storage bin 218. Alternatively, powdered lime may be fed directly into the storage bin 218. A conduit 220 delivers the lime from storage bin 218 to the dry feeder 196. The sludge converter 10 may use as the conditioner additive either sodium bicarbonate 192 or lime 210 singularly, or as a blended mixture thereof. The conditioner additive aids in the collection of the undesirable by-products in the bag house 190 and facilitates removal of the collected undesirable by-products from the bag house.

During the prototype testing, it was found that most of the sodium bicarbonate 192 is consumed during the precipitate-forming reaction within the bag house 190. During this reaction, the sodium bicarbonate reacts with the sulfur components of the undesirable by-products to form sodium sulfate. In a system using sodium bicarbonate 192 as the precipitate-forming catalyst for bag house 190, an additional binder, such as the flyash or Portland Cement or lime 118 is required for use by the pelletizing device 114.

In contrast to the sodium bicarbonate reaction in the bag house where most of the sodium bicarbonate is consumed, a relatively large amount of the lime 210 is not consumed during the bag house filtering process. Thus, the leftover lime 210 within the bag house may be reclaimed. This leftover or spent lime, along with the combustion dust and calcium sulfate produced during the bag house filtering action, is delivered through a conduit 222 to a valve 224. The valve 224 may be operated to send the spent lime, combustion dust and calcium sulfate through a conduit 226 for disposal. Alternatively, valve 24 may direct the spent lime, combustion dust and calcium sulfate through conduit 228 to the dry product storage container 110. It is apparent that if sodium bicarbonate is used as the conditioner additive, valve 224 and conduits 226 and 228 direct the spent sodium bicarbonate (if any), the combustion dust, and sodium sulfate either to disposal or to storage container 110.

This reclaimed lime received by the dry product storage container 110 serves several purposes. For example, the reclaimed lime may be used as a binder by the pelletizing device 114 when pelletizing is required, such as when the sludge converter 10 receives raw sludge, waste-activated sludge, or a mixture of raw sludge and waste-activated sludge. Additionally, the addition of lime to the standard sized product, be that either reclaimed lime from conduit 228 or additional lime received from source 118, advantageously enhances and increases the shelf life of the finished product 115. For example, by providing a lime mix of about 10% by dry weight the finished product 115, the shelf life of the finished product was found to be increased to at least seven months in duration. Furthermore, while the sulfate forms are not as useful for a binder as the lime, flyash or Portland Cement in the pelletizing step, the calcium sulfate and sodium sulfate advantageously enhance the nutrient content of the finished product 115.

This advantageously provides great flexibility to an operator of the sludge converter 10, in that the finished product 115 may be stored on site and removed only periodically therefrom. Alternatively, the finished product 115 may be bagged and distributed for subsequent retail resale to consumers wishing to buy discreet quantities of the finished product, as opposed to bulk truckloads. However, if the consumer wishes to immediately spread the finished product 115, the addition of lime to the standard sized product to enhance the shelf life thereof is not required. Therefore, the system as shown in FIG. 3 having dual inputs of sodium bicarbonate 192 and lime 210 may be particularly advantageous where an operator of the converter 10 has a variety of customers with different usage requirements. For example, if enhanced shelf life is required, the lime 210 may be added to the bag house 190 and then reclaimed into dry product storage. However, if the customer wishes to immediately spread the finished product 115, sodium bicarbonate 192 may be used in the bag house 190.

In operation, the sludge converter 10 receives sludge 12 from the plant through conduit 15 which delivers the sludge to the sludge feed surge tank 14. The operation of sludge converter 10 will also be used to illustrate a method of converting sludge into the pelletized finished product fertilizer 115. The sludge 12 is typically received at a 3-6% solids concentration.

The sludge received from the plant is mixed within tank 14 by an air mixing device 16, which receives compressed air through conduit 18. Conduit 20 delivers the mixed sludge from tank 14 to the grinder 22, which grinds the sludge. The conduit 24 delivers the ground sludge from grinder 22 to the sludge pump 26. The conduit 28 delivers the sludge from pump 26 to the dewatering device, shown as the centrifuge 42. Prior to delivery to the centrifuge 42, the polymer 30 is added to conduit 28 via conduit 32. The polymer may be any of a variety of chemical compositions well known to those skilled in the art to promote coagulation and flocculation of sludge. The liquid centrate removed by the centrifuge 42 is delivered by conduit 44 to the plant.

The dewatered sludge cake solids produced by centrifuge 42 are fed through the turbulator feed screw conveyor 46 to the mixing and sizing device, shown as the turbulator 60. Alternatively, the plant may provide the centrifuged stock input of previously dewatered sludge cake solids 54 through the screw conveyor 56 for delivery to the turbulator 60. The turbulator 60 sizes and mixes the dewatered sludge cake solids from centrifuge 42 with recycled dry product received through the recycle screw conveyor 102. The turbulator 60 produces the solids mixture which is fed through the dryer feed screw conveyor 62 to the dryer 70. Optionally, the turbulator bypass screw conveyor 64 may be provided to bypass the dewatered sludge cake solids around the turbulator 60.

The dryer 70 dries the solids mixture to produce dried solids. The sorter feed conveyor 82 delivers the dried solids from dryer 70 to the sorting device, shown as the sorting screen 80. The sorting screen 80 sorts the dried solids into standard sized product, undersized product and oversized product. The standard sized product, undersized product and oversized product are delivered via screw conveyors 96, 97 and 98, respectively to the recycle metering unit 100.

The recycle metering unit 100 operates in response to the recycle controller signal 108 received from recycle controller 40. The recycle controller 40 generates the control signal 108 by receiving and processing signals from various system monitors. These system monitors include the solids analyzer 48 with transducer 50 monitors the flow of dewatered sludge cake solids within conveyor 46, and in response thereto produces the dewatered sludge cake solid signal 52. The flow meter 34 with transducer 36 measures the sludge flow through conduit 28, and in response thereto produces the flow meter signal 38. The dryer temperature monitor 72 produces the dryer temperature signal 74 in response to the dryer temperature. The consistency of the mixture within dryer 70 is measured by an ammeter 76 which monitors the current drawn by the motor turning the agitator shaft within the dryer 70. In response to the motor current draw, ammeter 76 produces the horsepower signal 78. The temperature and moisture of the dried solids mixture exiting the dryer through conveyor 82 are monitored by transducers 86 and 92 respectively. The temperature monitor 84 produces the dried solids temperature signal 88 in response to the temperature monitored by transducer 86. The moisture sensor 90 produces the dried solids moisture signal 94 in response to the percentage of moisture measured by transducer 92. The recycle controller processes signals 38, 52, 74, 78, 88 and 94 to produce the recycle controller signal 108.

The recycle metering device then directs the dried sorted product received through conveyors 96, 97 and 98 through either conveyors 104 for disposal, 106 for final product processing, or 102 for recycling. Typically, the standard sized product is delivered through conveyor 106 for finished product processing, and the undersized and oversized products are recycled through conveyor 102.

The dry product storage feed conveyor 106 delivers the standard sized product from the recycle metering device 100 to the dry product storage container 110. As mentioned above, if the sludge received from the plant is digested sludge, the product received by container 110 will already be granular in form, and not require further processing by the pelletizing device 114. However, if raw sludge, waste-activated sludge, or the mixture of raw sludge and waste-activated sludge is provided by the plant, the dried product produced therefrom is delivered by the pelletizing feed screw conveyor 112 to the pelletizing unit 114. The pelletizing unit grinds, compacts, and granulates the product to form the finished product 115 which is delivered from the pelletizer 114 through conveyor 116. During storage in container 110, the bag house precipitate of calcium sulfate or sodium sulfate is added via conduit 228 to the standard sized product to enhance the nutrient content of the finished product 115. Prior to the pelletizing step, additional binder 118 which may be flyash, Portland cement or lime may be added through metering device 119 into conveyor 112. The finished product 115 may be stored, bagged or immediately hauled away for spreading.

Referring again to FIG. 2, the heat source 120 supplies the drying medium, such as steam or hot oil, through conduit 122 to the dryer 70. The heat source 120 receives the cooled drying medium from dryer 70 through conduit 124. The heat source 120 destroys through combustion the conveyor and dryer vapors received from preheaters 150, 170 and 184. The conveyor vapors may comprise noncondensable vapors, as well as any remaining condensable vapors and particulate matter. The dryer noncondensate may comprise noncondensable vapors, as well as any remaining condensable vapors and particulate matter. During the destroying step, the dryer noncondensate and the conveyor vapors are combusted by providing them as a supplement to the primary air provided to the heat source burner. These supplementary conveyor vapors and noncondensate are injected into the burner substantially at the prompt flame zone of the burner flame.

The heat source 120 preferably burns fuel which is the waste oil, and during this burning generates an exhaust gas having undesirable by-products, such as sulfur by-products which may be in a gaseous state. Conduit 188 delivers the heat source exhaust gas from heat source 120 to the bag house 190. The eductor injector 200 feeds the conditioner additive to the heat source exhaust gas stream flowing through conduit 188 via conduit 202. Thus, the exhaust gas has the conditioner additive dispersed therein upon entry into the bag house 190.

The conditioner additive may be either sodium bicarbonate 192 or raw lime 120, received from dry feeder 196 through conduit 198. In the illustrated embodiment, the lime 210 is supplied as raw lime which may be in large chunks. These chunks of raw lime are delivered through conduit 212 to the mill 214 where they are powderized. Conduit 216 delivers the powderized lime from mill 214 to the lime storage container 218. Alternatively, powderized lime may be delivered directly to the storage container 218.

The bag house 190 filters the exhaust gas, so that clean exhaust gas is vented to atmosphere through conduit 204, blower 206 and conduit 208. Alternatively, prior to venting the clean exhaust gas in conduit 208 to atmosphere, this gas may serve as the preheating heat source for the preheaters 150, 170 and 184. The particulate matter entrapped by bag house 190 may be delivered through conduit 222 to the valve 224. The valve 224 may be adjusted to direct this particulate matter for disposal through conduit 226.

Alternatively, this particulate matter may be reclaimed and delivered through conduit 228 to the dry product storage 210. If the conditioner additive is sodium bicarbonate, the bag house produces sodium sulfate, whereas if lime is used, calcium sulfate is formed in the bag house. If sodium bicarbonate is used, typically most of the sodium bicarbonate will be consumed during the bag house reaction. However, if lime is used a significant of lime may be reclaimed from the bag house. This reclaimed lime is then added to the standard sized product to act as the binder, as well as to enhance the shelf life of the finished product 115. If sodium bicarbonate is used in the air cleaning process, an additional binder of flyash, Portland Cement or additional lime 118 may be added through the metering device 119 to the pelletizing feed conveyor 112.

Having illustrated and described the principles of our invention with respect to a preferred embodiment, it should be apparent to those skilled in the art that our invention may be modified in arrangement and detail without departing from such principles. For example, other dewatering devices, sizing and mixing devices, drying devices, sorting devices, cyclones, heat sources, condensers, recycle controllers, and pelletizing devices may be used. Additionally, suitable substitutions may be made for the arrangement and location of the various sensors which provide control signals to the recycle controller. Furthermore, the use and placement of conveyor cyclones will vary depending upon the particular piping design of the particular sludge converter 10 application. We claim all such modifications falling within the scope and spirit of the following claims.

We claim:

1. A sludge converter for converting sludge into a fertilizer, comprising:
   a mixer which receives and mixes together dewatered sludge cake solids and a recycled portion of sorted product to produce a solids mixture;
   a dryer which receives and dries the solids mixture to produce dried solids;
   a sorter which receives and sorts into a sorted product comprising oversized product, undersized product, and standard sized product;
   a product screw conveyor which receives the standard sized product and has a product outlet and a recycle outlet, with the product outlet in communication with storage means for storing the standard sized product;
   a recycling screw conveyor in communication with the recycle outlet of the product screw conveyor, the recycling screw conveyor operating to recycle a portion of the standard sized product to the mixer to serve as the recycled portion of sorted product;
   a solids analyzer of a type which analyzes the solids content of the dewatered sludge cake solids received by the mixer and which produces a dewatered sludge cake solids signal;
   a dryer temperature sensor of a type which senses the temperature within the dryer and which produces a dryer temperature signal in response to the temperature sensed within the dryer;
   a moisture analyzer of a type which senses the moisture content of the dried solids exiting the dryer and which produces a dried solids moisture signal in response to the moisture content of the dried solids;
   a dryer exit temperature sensor of a type which senses the temperature of the dried solids exiting from the dryer, and which produces a dried solids temperature signal in response to the temperature of the dried solids exiting the dryer;
   an ammeter which measures the current drawn by a motor driving the dryer and which produces a horsepower signal in response to the sensed motor amperage; and
   a recycle controller of a type which receives the dewatered sludge cake solids signal, dryer temperature signal, dried solids moisture signal, dried solids temperature signal, and the horsepower signal, the recycle controller processing all said received signals and in response thereto producing a recycle conveyor controller signal;
   wherein the recycling screw conveyor operates in response to the recycle controller conveyor signal.

2. A sludge converter for converting sludge into a fertilizer, comprising:
   a mixer which receives and mixes together dewatered sludge cake solids and a recycled portion of sorted product to produce a solids mixture;
   a dryer which receives and dries the solids mixture to produce dried solids;
   a sorter which receives and sorts into a sorted product comprising oversized product, undersized product, and standard sized product;
   a product screw conveyor which receives the standard sized product and has a product outlet and a recycle outlet, with the product outlet in communication with storage means for storing the standard sized product;
   a recycling screw conveyor in communication with the recycle outlet of the product screw conveyor, the recycling screw conveyor operating to recycle a portion of the standard sized product to the mixer to serve as the recycled portion of sorted product;

a heat source supplying heat energy to the dryer, the heat source being fueled by waste oil which produces an exhaust gas containing undesirable by-products; and a bag house of a type which receives and filters the exhaust gas received from the heat source and which removes the undesirable by-products from the exhaust gas prior to venting the exhaust gas to atmosphere;

wherein:

the dryer produces condensable and noncondensable vapors and particulate matter while drying the solids mixture;

the sludge converter including a cyclone which receives the dryer vapor from the dryer and separates a substantial portion of the particulate matter from the dryer vapor;

the converter further including a condenser in communication with the cyclone and the heat source, the condenser condensing a substantial portion of the condensable vapors from the exhaust gas received from the cyclone; and the heat source receives and combusts the noncondensable vapors, as well as any remaining condensable vapors and particulate matter, from the condenser at a temperature of substantially 1700° F. by retaining the vapors and matter within the heat source for at least approximately one to two seconds.

3. A sludge converter according to claim 2 wherein the heat source comprises an oil heater and the heat energy is supplied by a heating medium comprising oil.

4. A sludge converter according to claim 1 wherein:
the dryer produces noncondensable vapors while drying the solids mixture; and
the converter further includes:
a heat source comprising an electrical oil heater supplying heat energy in the form of a heating medium comprising oil to the dryer; and
a thermal destruction unit which destroys the noncondensable vapors produced by the dryer.

5. A sludge converter according to claim 2 wherein the heat source comprises a boiler and the heat energy is supplied by a heating medium comprising steam.

* * * * *